United States Patent
Li et al.

(10) Patent No.: US 6,906,732 B1
(45) Date of Patent: Jun. 14, 2005

(54) TEXTURE MORPHING PROCESS PROVIDED BY THE PREFERRED EMBODIMENT OF THE PRESENT INVENTION

(75) Inventors: Xin Li, Issaquah, WA (US); Samir Abou-Samra, Vancouver (CA); Robert Champagne, Redmond, WA (US); Claude Comair, Vancouver (CA); Sun Tjen Fam, Vancouver (CA); Prasanna Ghali, Vancouver (CA); Jun Pan, Bellevue, WA (US)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 09/493,258

(22) Filed: Jan. 28, 2000

Related U.S. Application Data

(60) Provisional application No. 60/169,309, filed on Dec. 7, 1999.

(51) Int. Cl.[7] .................................................. G09G 5/00

(52) U.S. Cl. ........................................ 345/646; 345/582

(58) Field of Search ................................. 345/646, 582

(56) References Cited

U.S. PATENT DOCUMENTS

| | | | |
|---|---|---|---|
| 4,805,116 A | | 2/1989 | Liang et al. |
| 5,594,676 A | | 1/1997 | Greggain et al. |
| 5,995,110 A | * | 11/1999 | Litwinowicz ................ 345/848 |
| 6,262,739 B1 | * | 7/2001 | Migdal et al. ............... 345/423 |
| 6,304,268 B1 | * | 10/2001 | Iourcha et al. .............. 345/428 |
| 6,348,917 B1 | * | 2/2002 | Vaswani ..................... 345/418 |
| 6,362,833 B2 | * | 3/2002 | Trika ........................... 345/646 |
| 6,366,282 B1 | * | 4/2002 | Trika ........................... 345/423 |
| 6,407,743 B1 | * | 6/2002 | Jones ......................... 345/582 |
| 6,426,750 B1 | * | 7/2002 | Hoppe ........................ 345/428 |

FOREIGN PATENT DOCUMENTS

| | | |
|---|---|---|
| WO | WO 97/39420 | 10/1997 |
| WO | WO 00/04505 | 1/2000 |

OTHER PUBLICATIONS

Blanz et al., A Morphable Model for the Synthesis of 3D Faces, 1999, ACM SIGGRAPH, pp. 187–194.*

Chen, Shenchang Eric et al., "View Interpolation for Image Synthesis," *Computer Graphics Proceedings, Annual Conference Series, 1993*, pp 279–288.

Beier, Thaddeus et al., "Feature–Based Image Metamorphosis," *Computer Graphics*, 26, 2, Jul. 1992, pp 35–42.

(Continued)

*Primary Examiner*—Jeffery Brier
*Assistant Examiner*—Motilewa Good-Johnson
(74) *Attorney, Agent, or Firm*—Nixon & Vanderhye P.C.

(57) ABSTRACT

A fast, texture morphing algorithm for real-time computer simulation and video games dynamically generates objects "on the fly" by simplifying and reducing the computational load required for a texture morphing/blending process. Incremental interpolation techniques compute a morph parameter based on previous value and morph change rate. Precomputed initial and incremental morph parameter values for each texel component are applied during real-time morphing procedures using integer arithmetic. Approximation errors are reduced by incrementing/decrementing by an extra integer value when the number of morph iterations is a multiple of a frame counter. The frame counter avoids over-runs, and the morphing procedure is "snapped" the texel value to the precise texture target value to prevent under-runs and corresponding artifacts. Interlacing (applying interpolation to a subset of the texels each frame) significantly reduces computational load without introducing significant image artifacts. The morph texture buffer data structure is initially decomposed off-line to reduce the number of real-time calculations required to manipulate texel component data.

32 Claims, 11 Drawing Sheets

OTHER PUBLICATIONS

Aliaga, D.G., et al., "Smooth Transitions in Texture–Based Simplification," *Computers & Graphics*, vol. 22, No. 1, Jan./Feb. 1998, pp. 71–81.

Wolberg, George, "Image morphing: a survey," *The Visual Computer*, A20977, vol. 14, No. 8/9, 1998, pp 360–372.

Lazarus, Francis, et al., "Three–dimensional metamorphosis: a survey," *The Visual Computer*, A20977, vol. 14, No. 8/9, 1998, pp 373–389.

Gao, Peisheng, et al., "A work minimization approach to image morphing," *The Visual Computer*, A20977, vol. 14, No. 8/9, 1998, pp 390–400.

Seitz, Steven M., et al., "View Morphing," *Computer Graphics Proceedings, Annual Conference Series, 1996*, pp. 21–30.

Pighin, Frédéric, et al., "Synthesizing Realistic Facial Expressions from Photographs," *Proceedings of SIGGRAPH 98, Computer Graphics Proceedings, Annual Conference Series*, pp. 75–84 (Jul. 1998, Orlando, Florida).

* cited by examiner

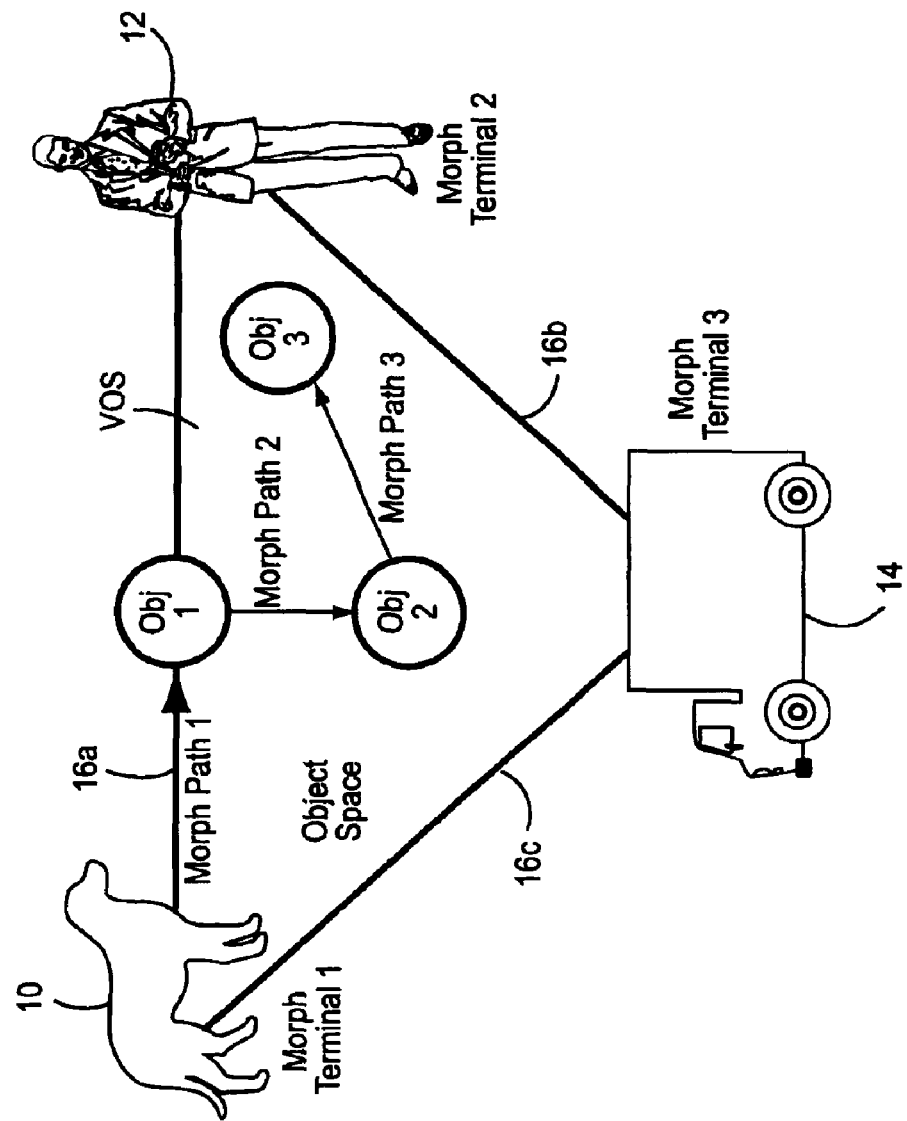

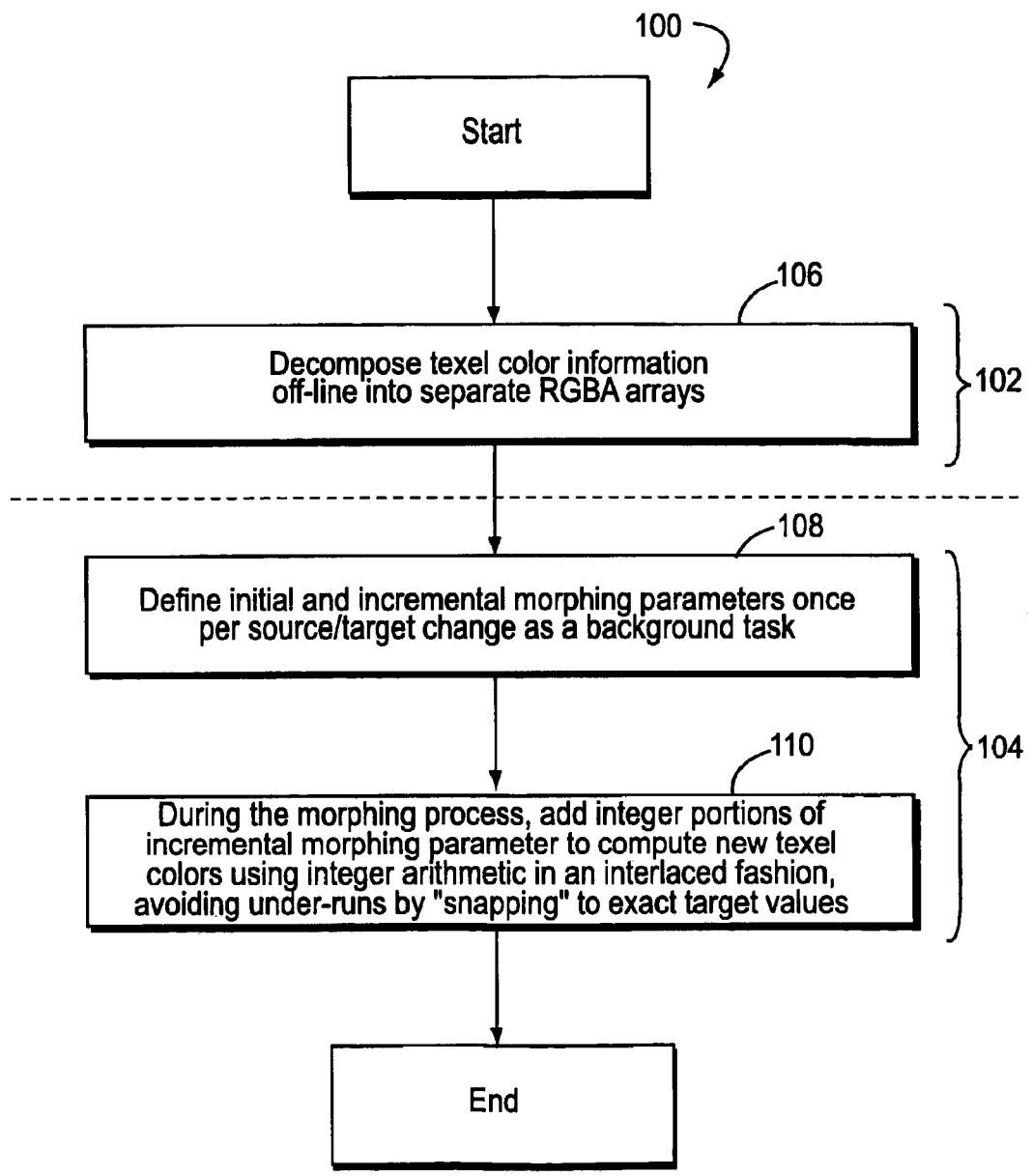

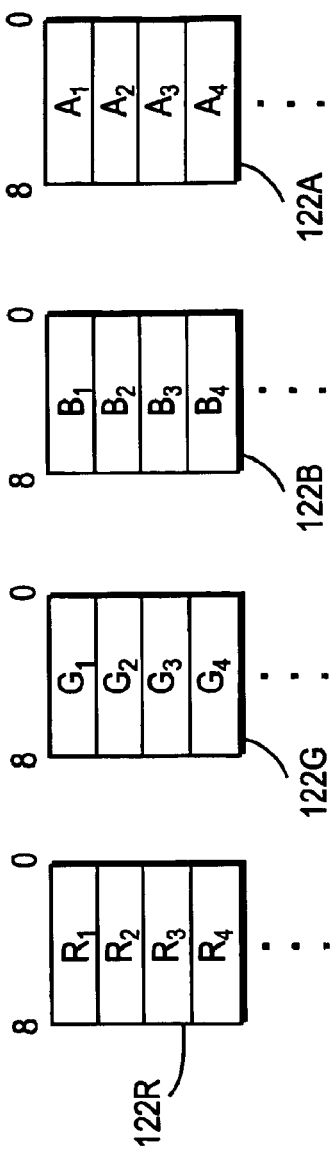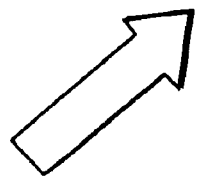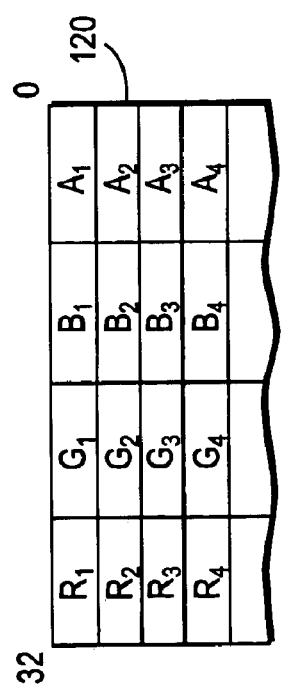
Fig. 4 Offline Color Description

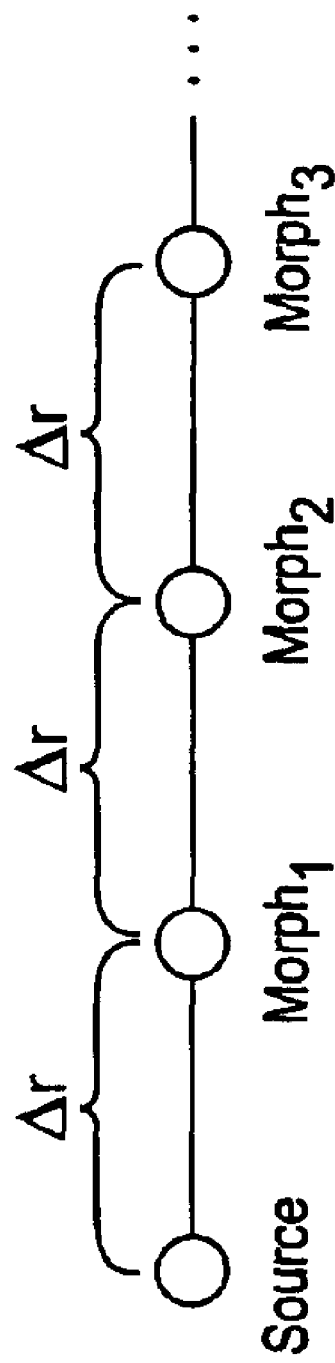
Fig. 5 Uniform Incremental Interpolation

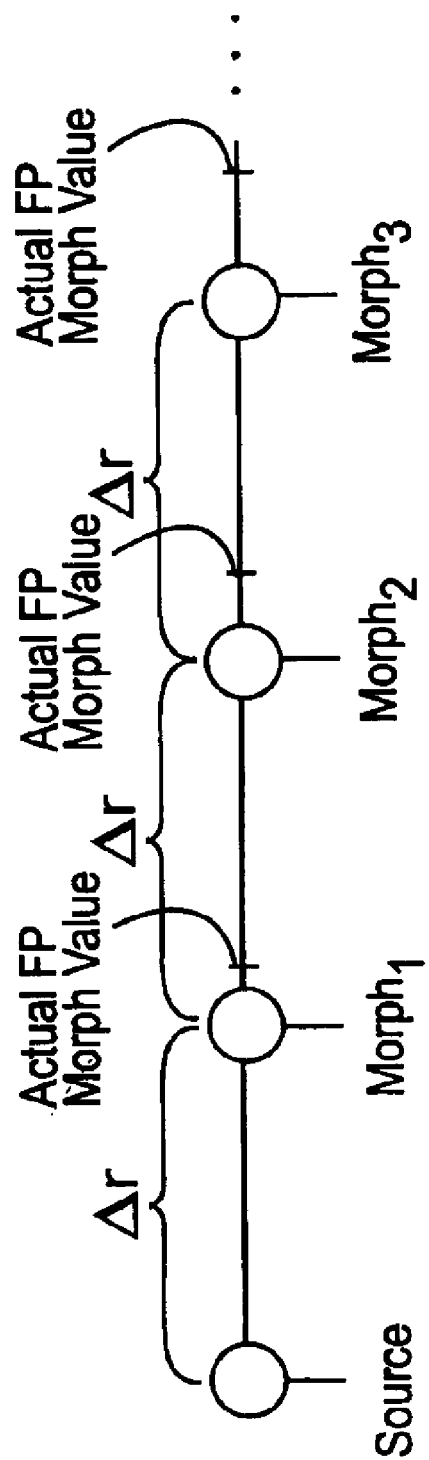
Fig. 5A Error Due to Integer Arithmetic

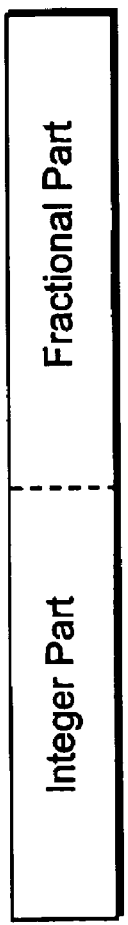
Fig. 5B Incremental Parameter
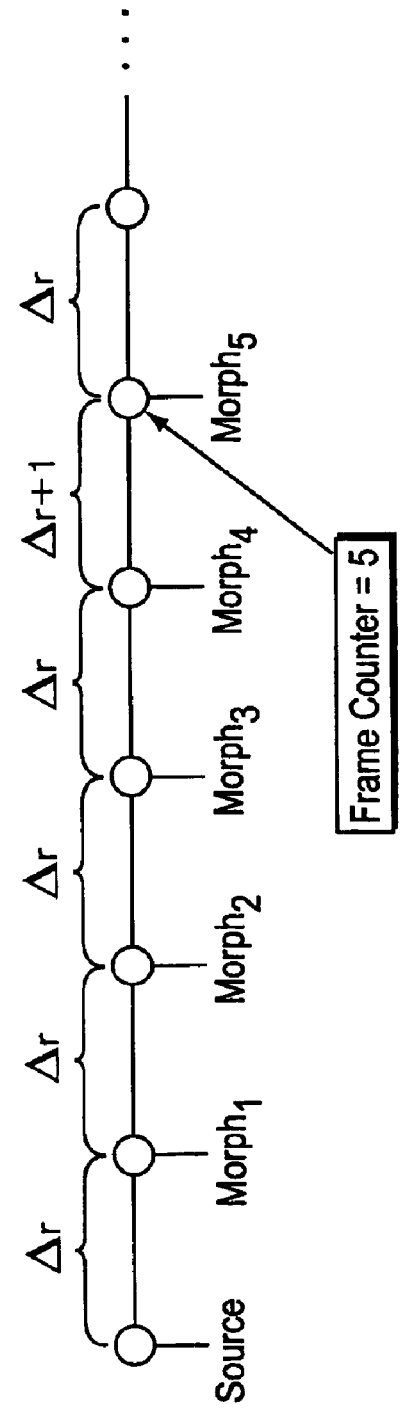
Fig. 5C Integer Correction Factor

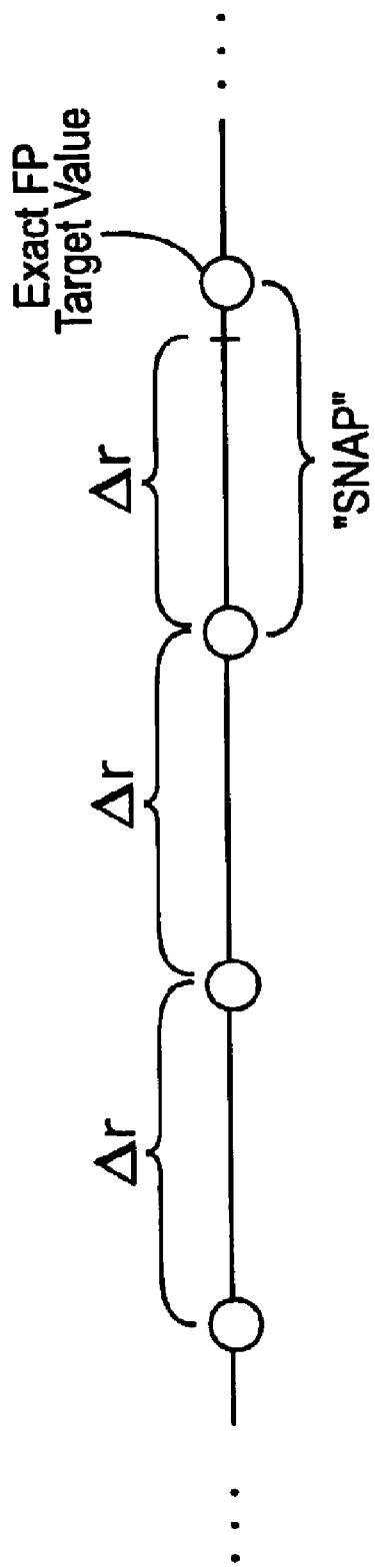
Fig. 5D "Snapping" to Prevent Underrun Artifacts

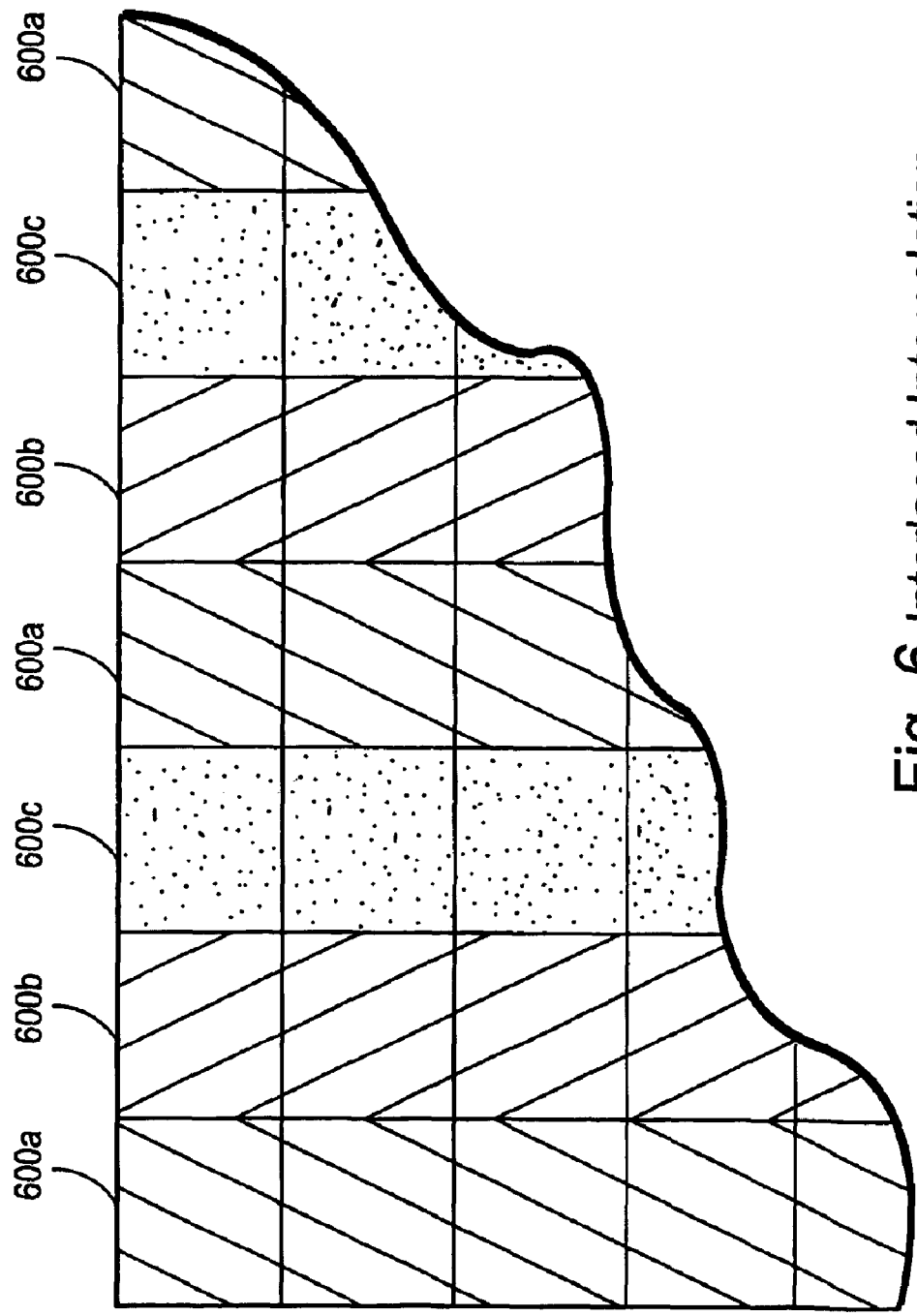

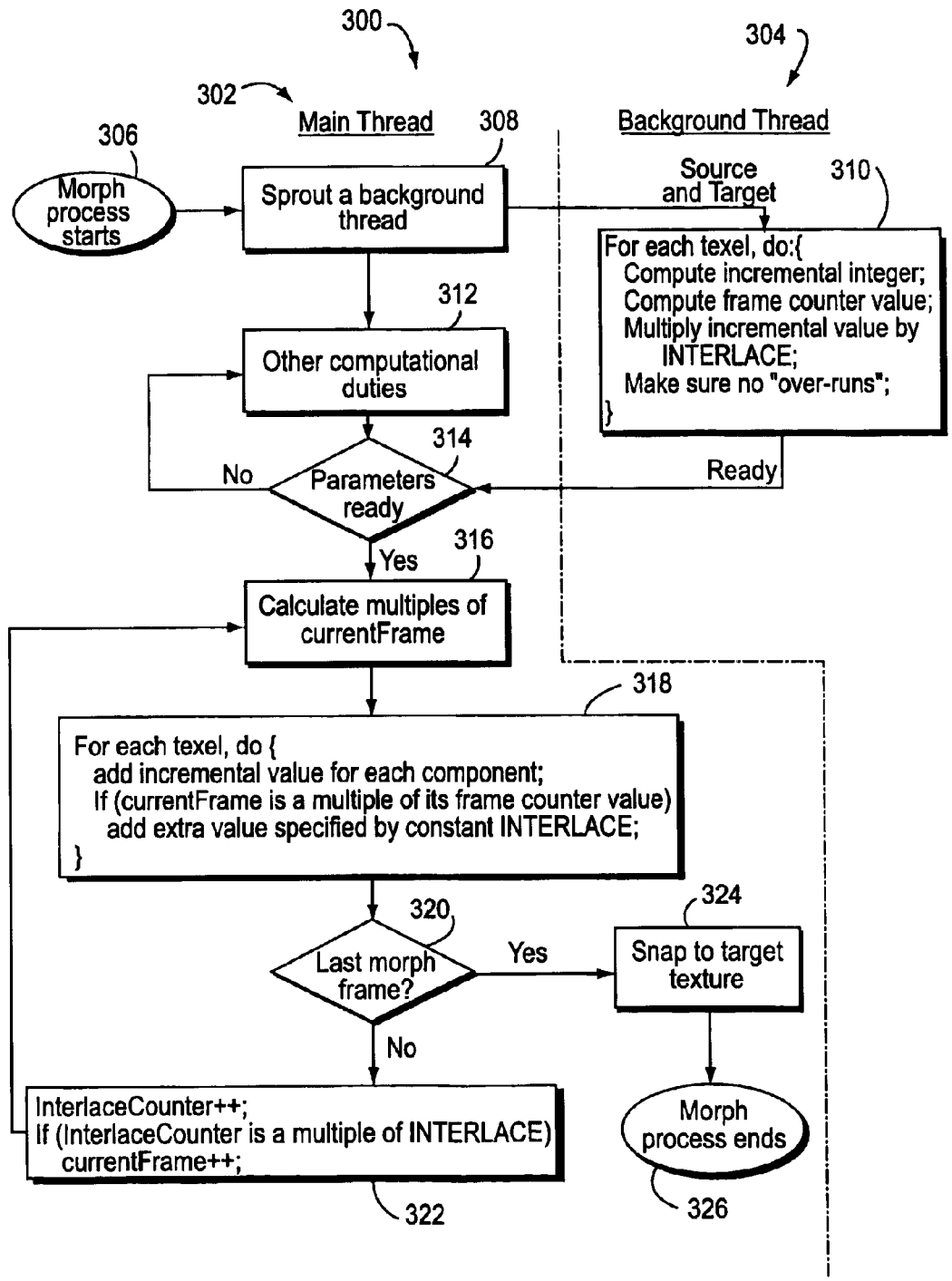
Fig. 7 Example Flowchart

TEXTURE MORPHING PROCESS PROVIDED BY THE PREFERRED EMBODIMENT OF THE PRESENT INVENTION

CROSS-REFERENCES TO RELATED APPLICATIONS

Priority is claimed from application No. 60/169,309 filed Dec. 7, 1999, which is incorporated herein by reference.

FIELD OF THE INVENTION

This invention relates to computer graphics, and more particularly, to techniques for metamorphosing ("morphing") a texture map from a source texture to a target texture.

BACKGROUND AND SUMMARY OF THE INVENTION

In graphics, metamorphosis, or morphing, is the process of gradually changing a source object through intermediate objects into a target object. For example, a person's face can be morphed into another person's face, an animal can be morphed into a human, etc. Morphing can create striking special effects, and has numerous applications—from modeling, computer simulation and video games to generation of animation sequences for the movie and advertising industries.

Past advancements in 3D morphing have tended to concentrate on developing algorithms for morphing geometry between source and target objects. However, modern 3D graphics commonly uses texture mapping to make 3D objects more interesting and apparently more complex. Generally, texture mapping involves taking a 2D image (e.g., a photographic or other digitized picture) and placing it onto a 3D surface. As one example, a brick wall can be imaged by mapping a brick-and-mortar texture onto a simple rectangular surface of a 3D "wall" object. Images of foliage, clouds, and a variety of other complex images can all be created using such texture mapping techniques.

When attempting to morph a textured 3D image, one must morph the texture as well as the geometry. Texture maps can be large, and each texel in the map should be morphed to provide a range of interpolated texture values between source and target textures. Such texture morphing therefore tends to be computationally expensive—effectively preventing resource-constrained real-time graphics systems such as home video game systems and personal computer graphics cards from providing real-time texture morphing functionality. What is needed is a texture morphing procedure that is fast and efficient enough to be performed in real-time within limited resource environments so that texture morphing can be performed "on the fly" in a limited resource graphics system.

The present invention provides a solution to this problem by providing a fast, real-time texture morphing algorithm that is both fast and efficient. The preferred embodiment of the invention provides a number of efficiencies to simplify and reduce the computations required within a texture morphing/blending process, such techniques including off-line texel component decomposition; incremental interpolation; frame counters; interlace morphing; and background low-priority threading. These techniques can be used individually and/or in combination to provide morphing procedures fast enough for real-time computer animation and simulation and video games.

In accordance with one aspect of an exemplary embodiment of the present invention, incremental interpolation techniques are used to reduce repetitive and heavy floating point number calculations/conversions associated with the typical texel blending/morphing process. The preferred embodiment computes an incremental morph parameter t for each texel component based on a previous value(s) and change rate (e.g., image frame rate and the time duration of the morphing process). Initial and incremental morph parameter values can be computed in advance for each texel component during a preliminary morph preparation background process. Then, during a subsequent real-time morphing process, these initial and incremental parameter values are applied incrementally to morph the texel components toward target texel component values.

To save floating-to-fixed point conversion time, the preferred embodiment uses integer addition to apply the incremental morph parameter values to the texel component values. However, to preserve accuracy, incremental and new values should be floating point numbers. The preferred embodiment resolves this inconsistency by using a frame counter concept. The morph parameter preparation process determines, for each texel component value, how many image frames it will take for a fractional portion of the incremental parameter value to change the integer portion of the texel component value. The preferred embodiment carefully chooses the resulting frame counter values to prevent over-runs, and uses them to specify when additional integer correction factors should be applied during the incremental interpolation process. To avoid image artifacts due to mismatch between the morphed texel component values and the actual target texel values, the preferred embodiment "snaps" the texel values to the precise (floating point) target values during the last morph iteration.

In accordance with another aspect of the exemplary preferred embodiment of the invention, incremental interpolation can be applied each frame time or other morphing period to less than all of texels being morphed. For example, some texels can be incrementally interpolated during a particular frame, other texels can be incrementally interpolated during a subsequent frame, etc.—so that all texels are incrementally interpolated across a certain (preferably small) number of frames without requiring each texel to be interpolated every frame. Such interlacing of incremental interpolation can significantly reduce computational load without introducing significant image artifacts.

In accordance with yet another aspect of the invention, the texture buffer data structure is initially decomposed off-line to reduce the number of real-time operations required to separate and manipulate texel component data for morphing. The preferred embodiment decomposes the standard texture map into separate arrays for each of the colors (RGB) and for alpha (transparency). The resulting component arrays (which may be 8-bit integer arrays, for example) can be manipulated directly by real-time software without additional masking/data extraction overhead.

One significant and advantageous application of the present invention is to allow dynamic generation of a virtually infinite number of video game characters and other textured objects "on the fly" using morphing procedures within home video game systems, personal computer graphics cards, and other inexpensive graphics systems. It is possible to pre-construct a number of objects with certain geometry and textures as primary sources and targets ("morph terminals"), and then use the texture morphing features to smoothly transform textures in real time between such objects to generate a sequence of continuous intermediate objects along morphing paths between the morph terminals. Since the preferred embodiment stores each set of intermediate morphed texture values as a texture map, any such intermediate texture map can be used as a source texture map for a further texture morphing operation along the same or different morph path.

BRIEF DESCRIPTION OF THE DRAWINGS

These and other features and advantages provided by the present invention will be better and more completely understood by referring to the following detailed description of preferred embodiments in conjunction with the drawings of which:

FIG. 2 shows an example virtual object morphing space;

FIG. 3 is a flowchart of an example overall texture morphing process provided by the present invention;

FIG. 4 shows example off-line decomposition of a texture map into separate component arrays;

FIGS. 5 & 5A–5D illustrate an example incremental morphing process;

FIG. 6 shows an example interlacing example; and

FIG. 7 is a flowchart of example steps the preferred embodiment performs to provide incremental interlaced texture morphing.

DETAILED DESCRIPTION OF PRESENTLY PREFERRED EXAMPLE EMBODIMENTS

Figure 1:
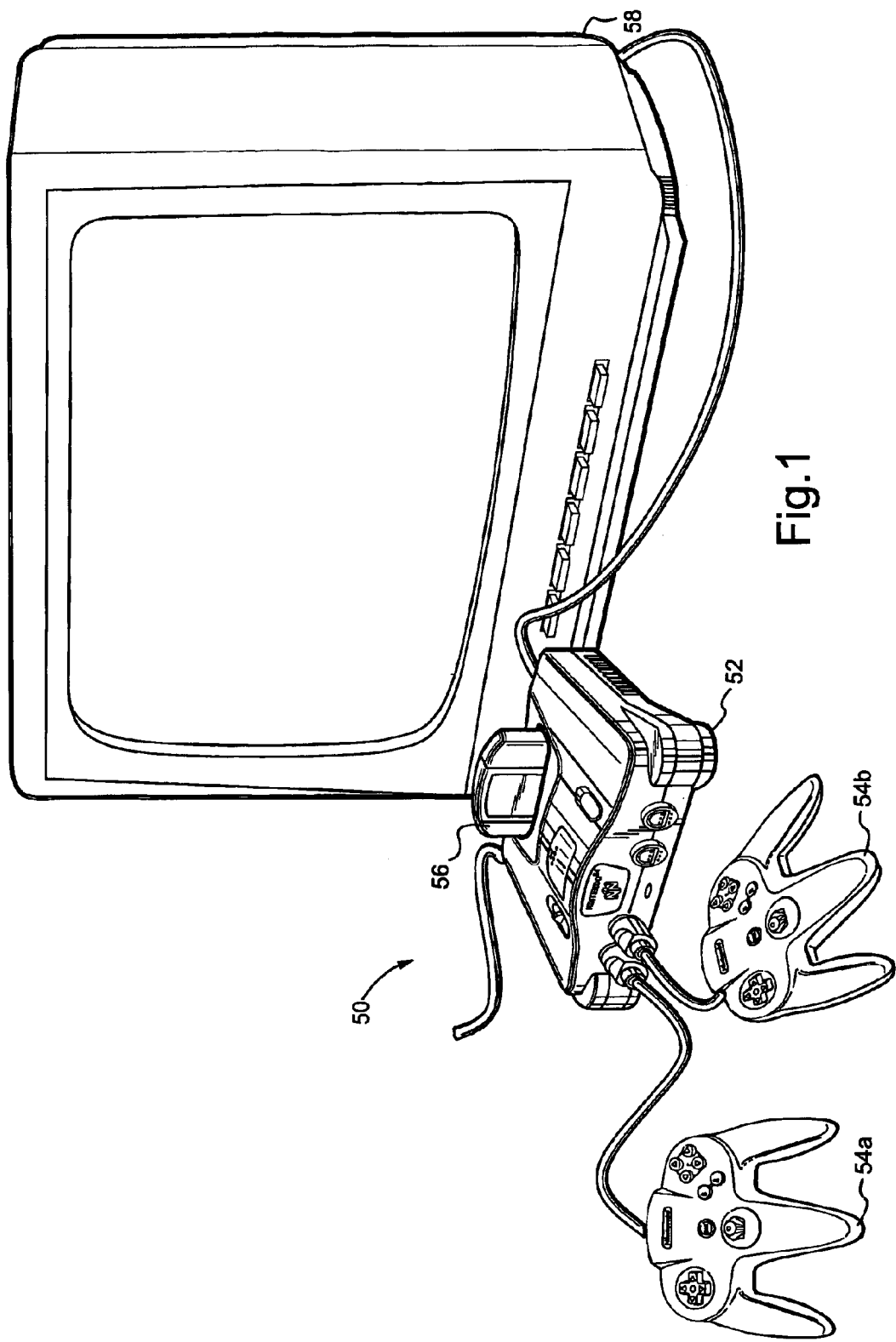
FIG. 1 shows an overall example 3D graphics system.

FIG. 1 shows an example real time 3-D computer graphics display system 50 that may be used to provide realistic interactive real time 3D morphing in accordance with the present invention. The FIG. 1 example system 50 includes a NINTENDO 64® 3-D video game console 52 and associated hand controllers 54a, 54b. A cartridge 56, optical disk or other storage medium storing a software animation (video game) program is operatively connected to console 52. The console 52 is connected to a display device 58 such as a conventional home color television set or computer monitor. Console 52 includes a 3D graphics engine that can render 3D animation on display 58 in real time response to user manipulation of controllers 54a, 54b. The software within cartridge 56 controls console 52 to display a sequence of animated video frames on display 58. Human players may operate hand controllers 54a, 54b to cause, under control of software within game cartridge 56, game characters to morph interactively in real time.

FIG. 2 shows an example of how intermediate morph objects can be dynamically created between three morph terminals 10, 12, 14 using the FIG. 1 system. The objects in circles (obj1, obj2 and obj3) are intermediate morph objects. In this particular FIG. 2 example, morphing terminals 10, 12 and 14 comprise a dog, a human and a vehicle, respectively. In this example, any morphing terminal 10, 12, 14 can be morphed into any other morphing terminal along morphing paths 16. For example, dog morph terminal 10 can be morphed into human morph terminal 12 (or vice versa) along morphing path 16a; human morph terminal 12 can be morphed into vehicle morph terminal 14 (or vice versa) along morph path 16b; and dog morph terminal 10 can be morphed into vehicle morph terminal 14 (or vice versa) along morph path 16c.

In this example, the morph procedure can be stopped at any point during the procedure (not necessarily at the source or the target), and the intermediate object at that point can be used as a new game character with an "in-between" shape and color. This new object (for example, object "Obj1"—a morph hybrid of a dog and a human) could be used as a source for yet another morph procedure to further morph the object into a further morph "Obj2"—and so on.

More generally, the morph terminals 10, 12, 14 define a virtual object space VOS. Any point inside the space VOS represents an intermediate object which could be rendered as any other pre-constructed object(s) in the simulations. Such an ability has the potential of stunning game players by its versatility and unpredictability—producing hit video game titles that are interesting and enjoyable to play.

Texture Morphing

Those skilled in the art understand that there already exist a number of efficient algorithms for morphing geometrical data of 3D objects. See, for example, Chen et al, "Interactive Shape Metamorphosis", 1995 *Symposium on Interactive 3D Graphics* pp. 43–44 (ACM SIGGRAPH April 1995). However, when morphing between the source and target 3D objects, not only the geometry (vertices and polygons) of the object, but also the color and texture of the object must be transformed from "source form" to "target form". Texture morphing has, in the past, typically been performed using a computationally intensive brute-force heuristic color blending approach.

A Heuristic Approach

For example, assume a conventional RGBA 32-bit texture map format and further assume that the current morph source, target and intermediate textures are stored in array sourceTexture[ ], targetTexture[ ] and mediateBuffer[ ] respectively. The brute-force heuristic solution for blending (interpolating) texture components can be described by the following pseudo-code for performing a general floating-point interpolation function to interpolate between source and target texture maps:

for(each texel in each texture tile) {
      //decompose source and target texels into R,G,B,A components;
      sourceRed=(sourceTexture[k] & 0xff000000)>>24;
      sourceGrn=(sourceTexture[k] & 0x00ff0000)>>16;
      sourceBlu=(sourceTexture[k] & 0x0000ff00)>>8;
      sourceAlp=(sourceTexture[k] & 0x000000ff);
      targetRed=(targetTexture[k] & 0xff000000)>>24;
      targetGrn=(targetTexture[k] & 0x00ff0000)>>16;
      targetBlu=(targetTexture[k] & 0x0000ff00)>>8;
      targetAlp=(targetTexture[k] & 0x000000ff);
      //interpolate the color components
      newRed=(1−t)*sourceRed+t*targetRed;
      newGrn=(1−t)*sourceGrn+t*targetGrn;
      newBlu=(1−t)*sourceBlu+t*targetBlu;
      newAlp=(1−t)*sourceAlp+t*targetAlp;
      //Assemble the new texel from new components;
      mediateBuffer[k]=(newRed<<24)|(newGrn<<16)|(newBlu<<8)|newAlp;
    } where $0.0 <= t <= 1.0$ is the morph parameter (i.e., the position of the current morph along a morph path 16).

Those skilled in the art will understand that such a brute-force heuristic approach is straightforward to implement but very computationally expensive—and is therefore not really feasible for real-time interactive limited resource computation environments such as 3D home video game systems.

A New Texture Morphing Process Provided by the Preferred Embodiment of the Present Invention FIG. 3 is a flowchart of an overall process provided by a presently preferred example process 100 of a preferred embodiment of the invention. Process 100 is divided into two overall stages: an authoring stage 102, and a run-time stage 104.

During authoring stage 102, process 100 performs a step 106 that decomposes texel color information to be morphed into separate RGBA component arrays. These separate arrays can be handled at run-time more efficiently than could a typical unified RGBA texel array. In the preferred embodiment, the separate RGBA arrays are stored in cartridge 56, from which they can be efficiently read out and copied into the read/write memory of system 52 for efficient manipulation.

During run-time stage 104 (which may, in the preferred embodiment, be performed in real time response to interactive inputs provided by user-operated controls 54), the preferred embodiment defines initial and incremental morphing parameters for the texels to be morphed (block 108). This morphing parameter definition step may be performed once per source/target change as a background task some time in advance of when morphing must begin (block 108). Then, during a run-time morphing step (block 110), the preferred embodiment applies the incremental morphing parameters to the RGBA texel arrays using integer addition to provide incremental interpolation in an interlaced fashion—avoiding under-runs by "snapping" the texel values to exact target values when (if) the morph target is reached.

Figure 3A:
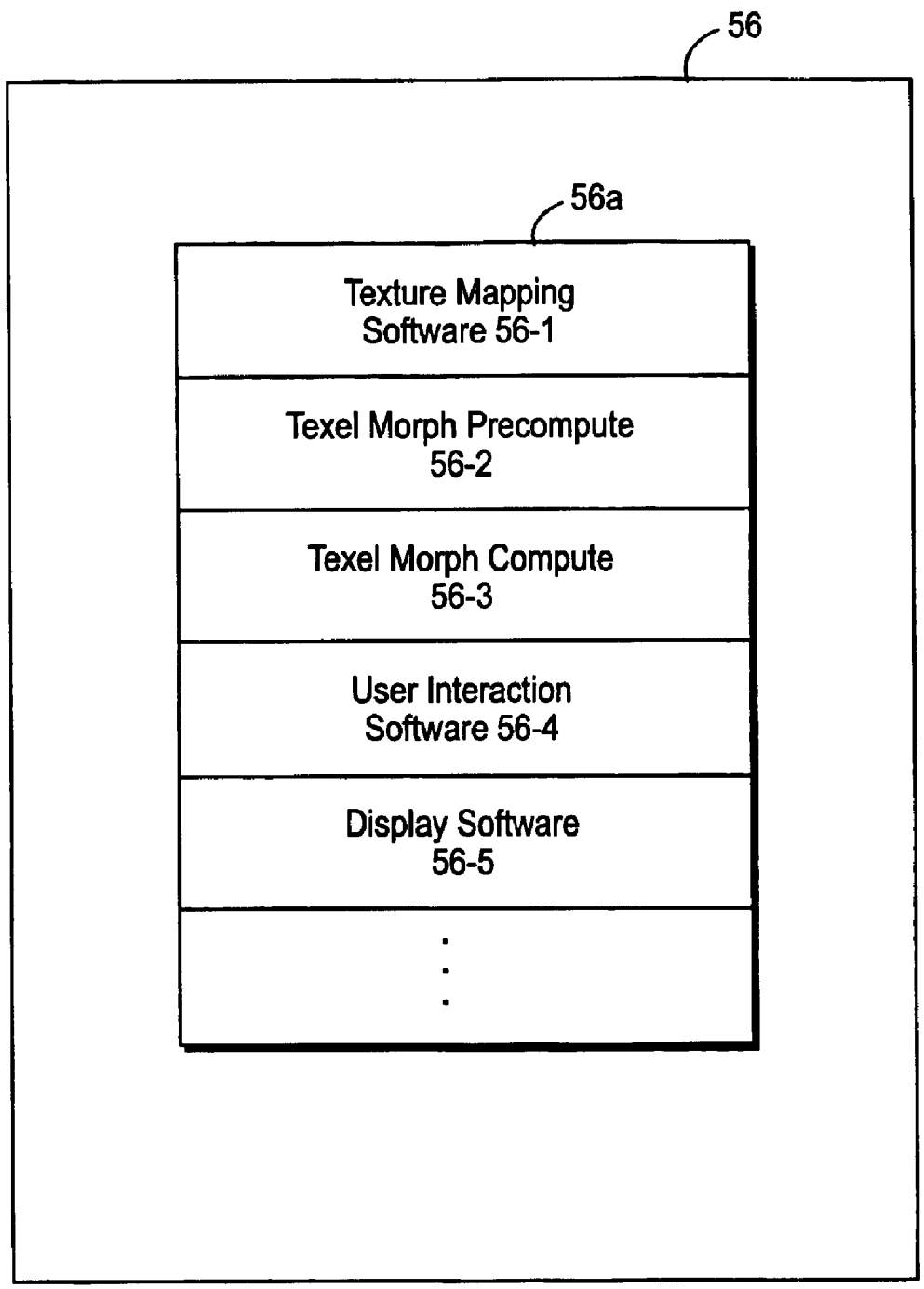
FIG. 3A shows an example graphics system storage device that stores information to control the FIG. 1 graphics system to perform the steps shown in FIG. 3.

FIG. 3A shows the FIG. 1 cartridge 56 or other storage medium storing software code 56a (e.g., in a read only memory) controlling system 50 to perform the FIG. 3 texture morphing process. In this example, storage device 56 stores, among other things:

conventional texture mapping software instructions 56-1;
instructions for implementing texel morph precompute step 108;
instructions for implementing texel morph compute step 110;
separate texture component arrays as shown in FIG. 4;
conventional instructions for controlling system 50 to interactively respond to user inputs via controllers 54; and
conventional instructions for controlling system 50 to display 3D textured objects.

Off-Line Color Decomposition:

FIG. 4 details an example off-line color decomposition step 106. To eliminate texel decomposition and new texel assembly at run-time, the preferred embodiment reserves and loads one 32-bit texture map block in the static display list (i.e. textureBuffer[ ]) for the intermediate object. Instead of using one 32-bit array 120 (a conventional form for texture maps), the preferred embodiment decomposes the RGBA texels components of texture map 120 off-line and uses resulting separate texel component arrays (e.g., 8-bit arrays 122R, 122G, 122B and 122A for the red, green, blue and alpha texel components, respectively) to store the texel components. As compared to the heuristic approach discussed above, the code that extracts the individual RGBA values from the 32-bit texel map can be eliminated, leaving the only the code for color interpolation left in the "for" loop as:

```
for(each texel in each texture tile) {
    unsigned char*texel= &textureBuffer[k];
        texel[RED]=(1-t)*sourceRed[k]+t*targetRed[k];
        texel[GRN]=(1-t)*sourceGrn[k]+t*targetGrn[k];
        texel[BLU]=(1-t)*sourceBlu[k]+t*targetBlu[k];
        texel[ALP]=(1-t)*sourceAlp[k]+t*targetAlp[k];
}
```

However, the preferred embodiment does not use this form of interpolation, but instead uses a faster incremental interpolation process discussed below.

Incremental Interpolation:

To reduce repetitive and heavy floating point number calculations, consider how the red component is computed (interpolated) for a particular texel:

$$r=(1-t)*SR+t*TR \quad (E.1)$$

where r is the new red component, SR and TR are source and target red components respectively, and t is a real number that changes along the morphing procedure from 0.0 through 1.0. If the frame rate (FR) is a constant (say, 30 frames per second), and the number of seconds (S) within which the morphing has to finish is given, then the rate of change of t, represented by $\Delta t$, is obtained by $$\Delta t=1/(FR*S) \quad (E.2)$$

In other words, the value of t can be pre-computed incrementally based on its value in the previous time slot and its change rate, i.e.

$$t'=t+\Delta t \quad (E.3)$$

Inserting (E.3) to (E. 1) to compute r' (the red component value for the frame next to r), we have $$r'=(1-t')*SR+t'*TR=(1-t-\Delta t)*SR+(t+\Delta t)*TR=(1-t)*SR+t*TR+ \\ \Delta t*(TR-SR)=r+\Delta r \quad (E.4)$$

where from (E.2)

$$\Delta r=\Delta t*(TR-SR)=(TR-SR)/(FR*S)$$

involves only constants (so long as the frame rate is constant) and thus can be pre-computed as a uniform increment only once in advance before the morph process starts. (E.4) states that the texel components can be interpolated through incremental addition (i.e., repeatedly adding or subtracting the same uniform constant value over and over again), including only one addition (subtraction) operation. See FIG. 5.

Notice that from (E. 1) we have $$r=SR|_{t=0}$$

This gives the initial condition of equation (E.4).

With this in mind, when given a source and target, the preferred embodiment divides the morph procedure into two phases:

Morphing preparation (FIG. 3, block 108) is done only once per source/target change. This is where the morph parameters (initial and incremental values for each texel) are computed. The following is example pseudo-code for such a computation:

```
numberOfFrames=frameRate*numberOfSeconds;
for(each texel in each texture tile) {
    redDlt[k]=(targetRed[k]-sourceRed[k])/
        numberOfFrames;
    grnDlt[k]=(targetGrn[k]-sourceGrn[k])/
        numberOfFrames;
    bluDlt[k]=(targetBlu[k]-sourceBlu[k])/
        numberOfFrames;
    alpDlt[k]=(targetAlp[k]-sourceAlp[k])/
        numberOfFrames;
    newRed[k]=sourceRed[k];
    newGrn[k]=sourceGrn[k];
```

```
    newBlu[k]=sourceBlu[k];
    newAlp[k]=sourceAlp[k];
}
```
Morphing process (FIG. 3, block 110) is performed each iteration to change the value of color components for each texel when the morphing is in progress. In the preferred embodiment, only addition operations are used in this step. The following is example pseudo-code:

```
for(each texel in each texture tile) {
    newRed[k]+=redDlt[k];
    newGrn[k]+=grnDlt[k];
    newBlu[k]+=BluDlt[k];
    newAlp[k]+=AlpDlt[k];
    unsigned char*texel= &textureBuffer[k];
    texel[RED]=newRed[k];
    texel[GRN]=newGrn[k];
    texel[BLU]=newBlu[k];
    texel[ALP]=newAlp[k];
}
```

A problem with the example morphing procedure described above relates to its use of integer addition. In order to preserve the accuracy, incremental and new values (i.e. redDlt[ ], newRed[ ], etc.) should be floating point numbers. However, the 32-bit RGBA texture format defines components (i.e. texel[RED], texel[GRN], texel[BLU] and texel[ALP]) to be 8-bit integers. Thus the last four assignment statements in the loop body above imply costly data type conversions. Hence, use of integer arithmetic to eliminate floating-point conversions for each incremental interpolation can (depending on the particular platform) significantly speed up the morphing calculations, but may also result in a loss of accuracy as compared to the use of floating point arithmetic—since the intermediate morph values will be only integer approximations of the actual value, that would be obtained using floating point interpolation techniques. See FIG. 5A. To eliminate this hidden cost, the preferred embodiment uses a non-uniform integer correction factor—i.e, it adds an additional integer correction factor (e.g., +1 or −1) during some but not all morphing steps—with a frame counter selecting when the correction factor should be added.

When preparing morph parameters, the preferred embodiment separates the integer part and decimal part of the color delta values (see FIG. 5B), and computes the number of frames (i.e. redCnt[ ]) required for the decimal (fractional) part to add up to 1. For instance, if the decimal part of the delta value is 0.2, then the value of its frame counter should be 5. The following is example pseudo-code:

```
for(each texel in each texture tile) {
    delta=(targetRed[k]-sourceRed[k])/numberOfFrames;
    redInt[k]=floor(delta);
    decimal=delta-redInt[k];
    redCnt[k]=(1.0/decimal)+0.5;
    //do the same to green, blue and alpha components;
}
```

When morphing texels, the preferred embodiment adds the integer part of an incremental value to a texel component in each iteration—and adds an extra 1 to the value only when the number of iterations is a multiple of N, where N is specified by its frame counter. See FIG. 5. Such further incrementing by a non-uniform amount corrects for approximation errors. Notice that all arithmetic operations in the iteration involve only 8-bit integers. The following is example pseudo-code:

```
//compute the multiples of current frame numbers.
for(i=1; i<NumberOfFrames; i++) {
    frames[i]=(currentFrame%i)? 0:1;
}
currentFrame++;
//morph texels . . .
for(each texel in each texture tile) {
    TEXEL_TYPE*texel= &textureBuffer[k];
    texel[RED]+=(fames[redCnt[k]])? (redInt[k]+1):
        redInt[k];
    texel[GRN]+=(fames[grnCnt[k]])? (grnInt[k]+1):
        grnInt[k];
    texel[BLU]+=(frames[bluCnt[k]])? (bluInt[k]+1):
        bluInt[k];
    texel[ALP]+=(frames[alpCnt[k]])? (alpInt[k]+1):
        alpInt[k];
}
```

The use of frame counters provides significant improvement in calculation speed, but also introduces a potential inaccuracy. Since it is not guaranteed that the decimal part of an incremental value can always be added up to exactly 1.0, the procedure is prone to "over-run" or "under-run" in certain circumstances, depending on how the value of a frame counter is calculated. For example, when approaching the end of morphing procedure, the texel values of an intermediate morph object may exceed that of the target object and create disturbing artifacts.

To overcome this over-run problem, the preferred embodiment carefully chooses frame counters values so they never lead to an "over-run" situation. In one simple illustration, the frame counter values are rounded down instead of up to ensure that the incremental interpolation process yields texel values that do not exceed the values they would take on if floating point arithmetic were used.

To solve the resulting "under-run" situation, the texel values of the intermediate morph object is "snapped" to that of the target object by using a floating-point operation at the last increment—making the now fully morphed texel values become precisely equal to the target object texel values. See FIG. 5D. The results provided by the preferred embodiment become an approximation to those supplied by the heuristic solution after this step.

Interlace Morphing:

To further speed up the morphing process, the preferred embodiment defines INTERLACE to be a positive constant integer. When preparing the morph parameters, the preferred embodiment multiplies the integer parts of incremental values of components by this constant. When morphing textures, the preferred embodiment updates the values of texels at a regular intervals specified by INTERLACE. For example, if INTERLACE=3, then the preferred embodiment modifies texels 0, 3, 6, . . . in the first iteration, modifies texels 1, 4, 7, . . . in the second, do 2, 5, 8, . . . in the next, and so forth. Here is example pseudo-code:

```
for(i=1; i<numOfFrames; i++) {
    frames[i]=(currentFrame%i)? 0:1;
}
for(k=interlace;    k<TOTAL_TEXELS;
    k+=INTERLACE) {
    TEXEL_TYPE*texel= &textureBuffer[k];
    texel[RED]+=(frames[redCnt[k]])? (redInt[k]+
        INTERLACE): redInt[k];
    texel[GRN]+=(frames[grnCnt[k]])? (grnInt[k]+
        INTERLACE): grnInt[k];
    texel[BLU]+=(frames[bluCnt[k]])? (bluInt[k]+
        INTERLACE): bluInt[k];
```

```
texel[ALP]+=(frames[alpCnt[k]])? (alpInt[k]+
    INTERLACE): alpInt[k];
}
interlace=(++interlace)%INTERLACE;
if(!interlace) currentFrame++;
```

FIG. 6 shows this example interlacing graphically, with one subset of texels 600a being incrementally interpolated every first of three successive frame times, a second subset of texels 600b being updated every second of three successive frame times, and a third subset of texels 600c being updated every third one of three successive frame times. The FIG. 6 interlacing morphs all texels every three frames, but only needs to morph ⅓ of the texels each frame—thus significantly reducing computational load. Interlace factors other than 3 (e.g., 2, 4, etc.) can be used.

Use of Background Low-Priority Thread:

Although the actually morphing procedure described above may run at a satisfactory speed, the procedure of preparing the morph parameters (i.e. incremental values and frame counters) is still computationally expensive. In some circumstances, depending on the number of texels in texture tiles to be interpolated, it can introduce noticeable delays. To avoid this visual anomaly, the morph parameter preparation stage can be sprouted as a task with a lower priority running at the background. In the preferred embodiment, the morphing procedure starts only after receiving a signal from this background task upon its completion. This effectively eliminates the frame rate interruptions.

Example Overall Texture Morphing Process

FIG. 7 is a flowchart of example run-time steps performed by the preferred embodiment of this invention. In the preferred embodiment. the process 300 shown in FIG. 7 is performed based on software instructions stored within cartridge 56. In this example, the FIG. 7 morph process 300 begins in response to user commands inputted through controls 54 and/or other code stored within cartridge 56 (block 306). Such an event causes a main thread 302 to begin executing. Main thread, in turn, dynamically sprouts a background thread 304 (block 308) to perform certain computationally intensive tasks in advance of a real-time morphing phase of the process. For example, background thread 304 (which may be passed the source and target texture maps as well as parameters relating to a constant frame rate and the duration of morphing) computes certain initial and incremental morph parameter values for each texel component within the texture map to be morphed (block 310). In this example process 300, for each texel, background thread 304 computes an incremental integer and a frame counter value, multiplies the incremental value by an interlace factor, and checks to make sure there are no overruns (block 310).

Meanwhile, main thread 302 performs other computational duties (block 312) and waits until background thread 304 is finished calculating the morph parameters (decision block 314). Once background thread 304 is ready and has completed its calculation tasks ("yes" exit to decision block 314), main thread 302 repetitively performs a morph processing loop comprising blocks 316–322.

Within this processing loop (which may be performed each imaging frame, i.e., thirty times per second), main thread 302 interpolates each texel component within the texture map by adding the uniform incremental value for each component (as conditioned on an interlace factor), and may add a non-uniform value (e.g., plus or minus one) in certain frames to compensate for approximation errors resulting from the integer arithmetic (block 318). An interlace counter is incremented to keep track of the interlacing factor vis a vis the current frame, and the interlacing factor may be used to select which subset of texels to interpolate during a given frame (block 322). This same calculation may be repeated for each frame until the last morphed framed approaching the target texture (as tested for by decision block 320). Upon reaching the last morphed frame ("yes" exit to decision block 320), process 300 "snaps" the texel component values to the actual target texture values (block 324)—thus avoiding noticeable image artifacts resulting from the integer approximation calculations performed by block 318).

While the invention has been described in connection with what is presently considered to be the most practical and preferred embodiment, it is to be understood that the invention is not to be limited to the disclosed embodiment. For example, although the invention has been described in the context of a 3D texture morphing system, it can also find utility in the context of 2D image morphing, warping and/or blending. The invention is intended to cover various modifications and equivalent arrangements included within the scope of the appended claims.

We claim:

1. A method for morphing and displaying a texture comprising:
   pre-decomposing at least some texels of a texture map into respective texel color components;
   predetermining, based on said decomposed texture map and target texel color component states defined by a target morph texture map defining a target morph texture, at least one incremental morph parameter corresponding to said respective texel color components;
   using said incremental morph parameter during real-time imaging to incrementally interpolate said texel color components toward target texel color component states through at least one intermediate morph texel color component state; and
   displaying an image based at least in part on said intermediate morph texel color state;
   wherein said incrementally interpolating comprises repetitively adding said predetermined incremental morph parameter to said predetermined texel components to produce a corresponding sequence of intermediate morph texel component states.

2. A method as in claim 1 wherein said incrementally interpolating comprises using an integer arithmetic calculation to repetitively increment or decrement said plural texel components based on said predetermined incremental morph parameter.

3. A method as in claim 1 wherein said predetermining calculates said incremental morph parameter as the amount of change in said texel components for each successive time period within a morphing procedure, and said incrementally interpolating changes said texel components in response to the integer portions of said incremental morph parameters.

4. A method as in claim 3 wherein said successive time periods comprise image frame times.

5. A method as in claim 3 wherein said incrementally interpolating conditions said change in said texel components based on which of said successive time periods has occurred within said morphing procedure to minimize the number of calculations required to morph said texture.

6. A method as in claim 3 further including selectively adding integers to or subtracting integers from said integer portions to reduce approximation errors in the context of integer arithmetic operations.

7. A method as in claim 1 wherein said incremental interpolation comprises incrementing or decrementing said texel components by integer approximations of said determined morph parameters, and compensating for approximation errors by performing at least one floating point operation to set said texel components to target texel component values.

8. A method as in claim 1 further including calculating a frame counter corresponding to said texel components, and selectively incrementing or decrementing said texel components in response to said frame counter.

9. A method as in claim 1 further including the preliminary step of storing said decomposed texel components in separate texel component arrays.

10. A method as in claim 9 wherein said texel components comprise red, green and blue color values and an alpha value.

11. A method for morphing and displaying a texture comprising:

pre-decomposing at least some texels of a texture map into respective texel color components;

predetermining, based on said decomposed texture map and target texel color component states defined by a target morph texture map defining a target morph texture, at least one incremental morph parameter corresponding to said respective texel color components;

using said incremental morph parameter during real-time imaging to incrementally interpolate said texel color components toward target texel color component states through at least one intermediate morph texel color component state; and displaying an image based at least in part on said intermediate morph texel color state;

wherein said incrementally interpolating comprises repetitively adding said predetermined incremental morph parameter to said predetermined texel components to produce a corresponding sequence of intermediate morph texel component states;

wherein said incremental interpolation selectively interpolates said texel components based on an interlace factor.

12. A method for morphing and displaying a texture comprising:

pre-decomposing at least some texels of a texture map into respective texel color components;

predetermining, based on said decomposed texture map and target texel color component states defined by a target morph texture map defining a target morph texture, at least one incremental morph parameter corresponding to said respective texel color components;

using said incremental morph parameter during real-time imaging to incrementally interpolate said texel color components toward target texel color component states through at least one intermediate morph texel color component state; and displaying an image based at least in part on said intermediate morph texel color state;

wherein said incrementally interpolating comprises repetitively adding said predetermined incremental morph parameter to said predetermined texel components to produce a corresponding sequence of intermediate morph texel component states;

further including conditioning said incremental interpolation step based on an interlace factor.

13. A system for morphing and displaying a texture comprising:

a color decomposer that pre-decomposes at least some texels of a texture map into respective texel color components;

a predeterminer that predetermines incremental texture component morph parameters based on said decomposed texels and target morph texture texel color component states;

an incremental interpolator that incrementally interpolates, in response to said predetermined incremental morph parameters, said texel components toward said target texel color component states through at least one intermediate morph texel component state; and a real-time image generator that generates a display based at least in part on said intermediate morph texel component state;

wherein said incremental interpolator repetitively adds said incremental morph parameters to the texel components to produce a corresponding sequence of intermediate morph texel component states.

14. A system as in claim 13 wherein said incremental interpolator comprises an arithmetic calculator that performs a repetitive integer arithmetic calculation to repetitively increment or decrement said plural texel components based on said determined incremental morph parameters.

15. A system as in claim 13 wherein said incremental interpolator calculates said incremental morph parameter as the amount of change in said texel components for each successive time period within a morphing procedure, and changes said texel components in response to the integer portion of said incremental morph parameters.

16. A system as in claim 15 wherein said successive time periods comprise image frame times.

17. A system as in claim 15 wherein said incremental interpolator conditions said change in said texel components based on which of said successive time periods has occurred within said morphing procedure to as to reduce the number of calculations required to morph said texture.

18. A system as in claim 15 further including an adder that selectively adds or subtracts 1 relative to said integer portion to minimize approximation errors in the context of integer arithmetic operations.

19. A system as in claim 13 wherein said incremental interpolator increments or decrements said texel components by integer approximations of said determined morph parameters, and compensates for approximation errors by performing at least one floating point operation to set said texel components to a target texel component value.

20. A system as in claim 13 further including a frame counter corresponding to said texel component, and wherein said incremental interpolator selectively increments or decrements said texel component in response to said frame counter.

21. A system as in claim 13 further including a separate array storing said texel component arrays.

22. A system as in claim 21 wherein said texel components comprise red, green or blue color values and an alpha value.

23. A system for morphing and displaying a texture comprising:

a color decomposer that pre-decomposes at least some texels of a texture map into respective texel color components;

a predeterminer that predetermines incremental texture component morph parameters based on said decomposed texels and target morph texture texel color component states;

an incremental interpolator that incrementally interpolates, in response to said predetermined incremental morph parameters, said texel components toward said target texel color component states through at least one intermediate morph texel component state; and a real-time image generator that generates a display based at least in part on said intermediate morph texel component state;

wherein said incremental interpolator repetitively adds said incremental morph parameters to the texel components to produce a corresponding sequence of intermediate morph texel component states;

wherein said incremental interpolator selectively interpolates said texel components based on an interlace factor.

24. A system for morphing and displaying a texture comprising:

a color decomposer that pre-decomposes at least some texels of a texture map into respective texel color components;

a predeterminer that predetermines incremental texture component morph parameters based on said decomposed texels and target morph texture texel color component states;

an incremental interpolator that incrementally interpolates, in response to said predetermined incremental morph parameters, said texel components toward said target texel color component states through at least one intermediate morph texel component state; and a real-time image generator that generates a display based at least in part on said intermediate morph texel component state;

wherein said incremental interpolator repetitively adds said incremental morph parameters to the texel components to produce a corresponding sequence of intermediate morph texel component states;

further including a conditioner that conditions said incremental interpolation based on an interlace factor.

25. An efficient texture morphing method for morphing and displaying textures using a real-time interactive 3D graphics system including user-manipulable controls, said system displaying at least one 3D texture-mapped object based at least in part on a morphed texture map comprising plural texels, said texture morphing method including:

(a) before real time imaging, pre-decomposing said texture map into plural texel components and precalculating incremental morph parameter values for the texel components;

(b) during real-time imaging, incrementally changing the values of said plural texel components over time based on said calculated incremental morph parameter values; and (c) during real-time imaging, generating images in real time based at least in part on said incrementally-changing texel component values;

wherein said incrementally changing step repetitively adds said calculated incremental morph parameter values to the texel components to produce a corresponding sequence of intermediate morph texel component states.

26. An efficient texture morphing method for morphing and displaying textures using a real-time interactive 3D graphics system including user-manipulable controls, said system displaying at least one 3D texture-mapped object based at least in part on a morphed texture map comprising plural texels, said texture morphing method including:

(a) before real time imaging, pre-decomposing said texture map into plural texel components and precalculating incremental morph parameter values for the texel components;

(b) during real-time imaging, incrementally changing the values of said plural texel components over time based on said calculated incremental morph parameter values; and (c) during real-time imaging, generating images in real time based at least in part on said incrementally-changing texel component values;

wherein said incrementally changing step repetitively adds said calculated incremental morph parameter values to the texel components to produce a corresponding sequence of intermediate morph texel component states;

wherein said calculating step (a) comprises calculating the value of $\Delta r = (TC-SC)/(FR*T)$, where SC is the source texel component value, TC is the target texel component value, FR is the frame rate and T is the morphing duration.

27. An efficient texture morphing method for morphing and displaying textures using a real-time interactive 3D graphics system including user-manipulable controls, said system displaying at least one 3D texture-mapped object based at least in part on a morphed texture map comprising plural texels, said texture morphing method including:

(a) before real time imaging, pre-decomposing said texture map into plural texel components and precalculating incremental morph parameter values for the texel components;

(b) during real-time imaging, incrementally changing the values of said plural texel components over time based on said calculated incremental morph parameter values; and (c) during real-time imaging, generating images in real time based at least in part on said incrementally-changing texel component values;

wherein said incrementally changing step repetitively adds said calculated incremental morph parameter values to the texel components to produce a corresponding sequence of intermediate morph texel component states;

wherein said incrementally changing comprises repetitively incrementing or decrementing said plural texel component values by uniform amounts at a first predetermined frequency based on the integer portion of $\Delta r$, and adding or subtracting a further integer value at a further predetermined frequency less than said first predetermined frequency.

28. An efficient texture morphing method for morphing and displaying textures using a real-time interactive 3D graphics system including user-manipulable controls, said system displaying at least one 3D texture-mapped object based at least in part on a morphed texture map comprising plural texels, said texture morphing method including:

(a) before real time imaging, pre-decomposing said texture map into plural texel components and precalculating incremental morph parameter values for the texel component;

(b) during real-time imaging, incrementally changing the values of said plural texel components over time based on said calculated incremental morph parameter values; and (c) during real-time imaging, generating images in real time based at least in part on said incrementally-changing texel component values;

wherein said incrementally changing step repetitively adds said calculated incremental morph parameter values to the texel components to produce a corresponding sequence of intermediate morph texel component states;

wherein said incrementally changing comprises repetitively incrementing or decrementing said plural texel component values by uniform amounts at a first predetermined frequency based on the integer portion of Δr, and adding or subtracting a further integer value at a further predetermined frequency less than said first predetermined frequency; and wherein said first and second predetermined frequencies are each based on image frame rate.

29. An efficient texture morphing method for morphing and displaying textures using a real-time interactive 3D graphics system including user-manipulable controls, said system displaying at least one 3D texture-mapped object based at least in part on a morphed texture map comprising plural texels, said texture morphing method including:

(a) before real time imaging, pre-decomposing said texture map into plural texel components and precalculating incremental morph parameter values for the texel components;

(b) during real-time imaging, incrementally changing the values of said plural texel components over time based on said calculated incremental morph parameter values; and (c) during real-time imaging, generating images in real time based at least in part on said incrementally-changing texel component values;

wherein said incrementally changing step repetitively adds said calculated incremental morph parameter values to the texel components to produce a corresponding sequence of intermediate morph texel component states;

wherein said incrementally changing comprises repetitively incrementing or decrementing said plural texel component values by uniform amounts at a first predetermined frequency based on the integer portion of Δr, and adding or subtracting a further integer value at a further predetermined frequency less than said first predetermined frequency; and wherein said second predetermined frequency is based on a frame counter that counts a predetermined number of image frames.

30. An efficient texture morphing method for morphing and displaying textures using a real time interactive 3D graphics system including user-manipulable controls, said system displaying at least one 3D object based at least in part on a morphed texture map comprising plural texels each comprising plural texel components, said texture morphing and display method including:

(a) before real-time imaging, pre-decomposing said texels into plural texel components and precalculating incremental morph parameter values for said texel components, including rounding down calculated incremental interpolation values to the closest integer values to provide integer results and calculating period counter values based on non-integer remainders of said calculated incremental interpolation values;

(b) at least in partial response to user interaction with said controls, changing texel component values at a first periodic frequency based on said integer results;

(c) at least in partial response to said period counter, further changing said texel component values at a second periodic frequency less than said first periodic frequency to compensate for approximation errors introduced by step (b); and generating an image display based at least in part on said changed and further changed texel component values.

31. In a real-time interactive graphics system including at least one user-manipulable control, a method for generating animation objects in real time by morphing a source texture map including plural texels each having plural components, into a target texture map including plural texels each having plural components, said method comprising:

(a) calculating incremental morph parameter values for texels of said first texture map, and incrementally interpolating the value of said plural texel components of said first texture map over time based on said calculated uniform incremental morph parameter values so as to morph said first texture map toward said second texture map including repetitively adding said incremental morph parameters to the texel components to produce a corresponding sequence of intermediate morph texel component states;

(b) using an intermediate texture map generated by step (a) to texture map an animation object;

(c) controlling at least one of the displayed orientation and position of said texture-mapped animation object at least in part in response to user manipulation of said control; and (d) generating an image based at least in part on said controlled texture-mapped animation object.

32. A storage device for use with a real-time interactive graphics system including at least one user-manipulable control, said storage device storing information used by said system for generating animation objects in real time by morphing a source texture map including plural texels each having plural components, into a target texture map including plural texels each having plural components, said storage device comprising:

a first storage portion that stores information controlling said system to calculate incremental morph parameter values for texels of said source texture map, and to incrementally interpolate the values of said plural texel components of said first texture map over time into values of plural texel components of said target texture map by uniform integer amounts based on said calculated incremental morph parameter values so as to morph said source texture map through at least one intermediate texture map toward said target texture map;

a second storage portion that stores information controlling said system to use said intermediate texture map to texture map an animation object; and a third storage portion that stores information controlling at least one of the displayed orientation and position for display of said texture-mapped animation object at least in part in response to user manipulation of said control.

* * * * *

UNITED STATES PATENT AND TRADEMARK OFFICE
CERTIFICATE OF CORRECTION

| | |
|---|---|
| PATENT NO. | : 6,906,732 B1 |
| APPLICATION NO. | : 09/493258 |
| DATED | : June 14, 2005 |
| INVENTOR(S) | : Li et al. |

It is certified that error appears in the above-identified patent and that said Letters Patent is hereby corrected as shown below:

Title Page and Col. 1 line 1 Should read
(54)   INCREMENTAL INTERLACE INTERPOLATION FOR TEXTURE MORPHING Signed and Sealed this Second Day of January, 2007

JON W. DUDAS
*Director of the United States Patent and Trademark Office*